United States Patent [19]

Croce et al.

[11] Patent Number: 5,055,495

[45] Date of Patent: Oct. 8, 1991

[54] STABILIZATION AND FOAMING OF POLYVINYLCHLORIDE RESINS

[75] Inventors: Michael R. Croce, Brooklyn; Stuart D. Brilliant, Levittown, both of N.Y.

[73] Assignee: Witco Corporation, New York, N.Y.

[21] Appl. No.: 564,792

[22] Filed: Aug. 8, 1990

Related U.S. Application Data

[62] Division of Ser. No. 519,002, May 4, 1990, Pat. No. 4,977,193.

[51] Int. Cl.$^5$ ................................................. C08V 9/10
[52] U.S. Cl. .................................. 521/85; 521/89; 521/93; 521/145; 524/140; 524/156; 524/184; 524/186; 524/261; 524/301; 524/327
[58] Field of Search .................. 521/85, 93, 145, 89; 524/140, 156, 184, 186, 261, 301, 327

[56] References Cited

U.S. PATENT DOCUMENTS

| | | | |
|---|---|---|---|
| 2,597,920 | 5/1952 | Carroll | 524/178 |
| 2,641,596 | 6/1953 | Feister et al. | 524/180 |
| 2,648,650 | 8/1953 | Weinberg et al. | 524/180 |
| 2,763,632 | 9/1956 | Johnson | 524/178 |
| 2,914,506 | 11/1959 | Mock et al. | 524/180 |
| 3,640,953 | 2/1972 | Brecker et al. | 524/180 |
| 3,706,679 | 12/1972 | Hopton | 521/145 |
| 4,698,368 | 10/1987 | Müller | 521/93 |
| 4,977,193 | 12/1990 | Croce et al. | 521/85 |

*Primary Examiner*—Morton Foelak
*Attorney, Agent, or Firm*—Lockwood, Alex, FitzGibbon & Cummings

[57] ABSTRACT

An improvement in the method for the foaming of polyvinylchloride resins by the use of a blowing agent and an activator therefor which uses as the activator a mixture of at least one organotin mercapto acid ester and a diorganotin oxide complex with an ester of an oxygen-containing acid.

8 Claims, No Drawings

STABILIZATION AND FOAMING OF POLYVINYLCHLORIDE RESINS

This application is a divisional of copending application Ser. No. 519,002, filed May 4, 1990, now U.S. Pat. No. 4,977,193.

BACKGROUND AND DESCRIPTION OF THE INVENTION

This invention relates to the stabilization and preparation of foamed polyvinylchoride resins. In particular this invention relates to the use of stabilizers for foamed polyvinylchloride resins as activators for the blowing agents used in the preparation of foamed polyvinylchloride resin. An important aspect of this invention is the use of organotin compounds as the thermal stabilizer and activator for the blowing agent in the preparation of rigid foamed polyvinylchloride products.

It is well established that organotin stabilizers are effective for the thermal stabilization of polyvinylchloride resins. U.S. Pat. Nos. 2,597,920 to Carroll and 2,763,632 to Johnson disclose reaction products of diorganotin oxides and esters of diorganotin oxides as heat and light stabilizers for vinylchloride resins. Despite their high tin content, these reaction products are rather poor in stabilizing effectiveness.

Among the effective organotin stabilizers for inhibiting the polyvinylchloride resins at high temperatures are the organotin mercapto acid esters. Patents disclosing the use of these compounds include U.S. Pat. Nos. 2,641,588 and 2,641,596 to Leistner et al; U.S. Pat. No. 2,648,650 to Weinberg and U.S. Pat. No. 2,890,956 to Mack et al.

The dialkyltin bis-alkylthioglycolates, alone and in combination with other components, have been widely accepted for various commercial applications. Among the combinations reported including the dialkyltin bis-alkyl thioglycolates as a component are U.S. Pat. No. 2,914,506 to Mack et al disclosing combinations of organotin thioglycolates with compounds such as metal salts, epoxy compounds, phosphates and phenols and U.S. Pat. No. 3,640,953 to Brecker et al disclosing combinations of diorganotin mercaptocarboxylic acid esters and a diorganotin-ester complex which is a reaction product of a diorganotin oxide and an ester of an oxygen-containing acid. The compounds of Brecker et al have particularly been found to be highly efficient in the heat stabilization of polyvinylchloride.

One important utility for polyvinylchloride resins is in the preparation of rigid foamed articles. The articles are ordinarily manufactured by known methods, for example by extrusion, by blending the plastics material with a suitable blowing agent and choosing the processing temperature such that it is above the decomposition temperature of the blowing agent. Often, however, the decomposition temperature is too high above the processing temperature, so that the blowing agent cannot be used alone. For this reason, activators are often employed which hasten the decomposition of the blowing agent and/or lower the decomposition temperature.

In the search for effective activators, the use of compounds that are also effective thermal stabilizers has become a highly desirable possibility in order to reduce the number of components of the resin blend. Organotin oxides, organotin alcoholates and mixtures thereof have been described in the literature as being useful as activators. U.S. Pat. No. 4,698,368 to Muller discloses mixtures of organotin mercaptides as imparting good light and heat stability and as being effective activators for the manufacture of foamed plastics. These mixtures can optionally contain an organotin carboxylate. Also disclosed in this patent as being useful as light and heat stabilizers and as activators are mixtures of organotin mercaptides and organotin carboxylates.

Also U.S. Pat. No. 3,706,679 to Hopton et al discloses a mixture of organotin thioglycolate, particularly di n-butyltin bis(isoctylmercaptoacetate) and barium salts of saturated fatty acids having from 14 to 18 carbon atoms, such as barium stearate or palmitate.

Yet despite the foregoing disclosures, there is present a need for additional activators for the preparation of polyvinylchloride resins that also afford effective thermal stabilization of the foamed polyvinyl resin.

It is therefore an object of the present invention to provide effective activators for the preparation of rigid foamed polyvinylchloride articles.

Another object of the present invention is to prevent the discoloration of foamed polyvinylchloride articles during their manufacture.

Another object of the present invention is to provide compounds useful as thermal stabilizers and activators for the normal blowing agents useful in foaming polyvinylchloride resins.

Still another object of the present invention is the formation of rigid polyvinyl articles utilizing the blowing agents and thermal stabilizers that are acceptable commercially.

SUMMARY OF THE INVENTION

In accordance with the present invention polyvinylchloride articles can be produced by foaming polyvinylchloride resin with a standard blowing agent and an activator therefor comprising a dimethyltin mercapto acid ester and a diorganotin oxide complex with an ester of an oxygen-containing acid. This activator system not only produces a superior foamed polyvinylchloride resin but also provides excellent thermal stabilization.

DETAILED DESCRIPTION OF THE INVENTION

The successful production of rigid articles from foamed polyvinylchloride requires a balance of many factors in the formulation of the composition to be extruded or otherwise formed. The formulation comprises the polyvinylchloride resin, a blowing agent, and other conventional components such as processing agents, impact modifiers and internal and external lubricants.

Chemical blowing agents that release nitrogen may be used in forming a microcellular structure in the vinylchloride resins used in making the foamed compositions. The preferred chemical blowing agents are amides, particularly azoamides and more specifically azodicarbonamide. Examples of other useful blowing agents are:

N,N'-dinitroso-N,N'-dimethyl terephthalamide
N-aminophthalimide
4,4'-oxybis (benzenesulphonylhydrazide)
N,N'-dinitrosopentamethylenetetramine
Azoisobutyric dinitrile
Diazoaminobenzene
Dinitropentamethylene tetramine
Benzenesulfohydrazide
Terephthalyl bis (N-nitrosomethylamide)
Toluene-2,4-bis (sulfonyl hydrazide)
p-tertiary butylbenzazide)

p-carbomethoxy benzazide
Diarylpentaazadiene
3 methyl,1,5-diphenylpentaazadiene

The blowing agent is used in an amount sufficient to produce the degree of foaming desired and generally can be used in an amount of about 0.1 to about 3.5 parts by weight per 100 parts of resin being blown.

The activator system functions to control the temperature at which the vinyl resin fuses to provide the proper environment into which the blowing agent releases gaseous nitrogen. Unless the activator system of this invention is used in combination with a blowing agent as shown in the formulations above, improper blow occurs throughout the structure, the profile is uneven and either is not encased in a skin or the skin becomes uneven and rough due to the presents of blow holes. These problems are especially severe and present when the vinyl resin being blown is unplasticized.

The activator system of the present invention comprises:

(a) at least one organotin mercapto acid ester having the formula:

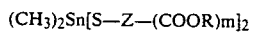

$$(CH_3)_2Sn[S-Z-(COOR)m]_2$$

wherein Z is an organic radical and R is an organic group derived from an alcohol having from one to about four hydroxyl groups and from one to thirty carbon atoms, and m is an integer from one to four, and (b) a diorganotin oxide complex with an ester of an oxygen-containing acid, wherein the two organo groups are each attached to tin through carbon atoms and are hydrocarbon radicals having from one to about thirty carbon atoms, and said complex is derived from the reaction of the diorganotin oxide with an ester derived from an aliphatic or aromatic alcohol or phenol and an acid selected from the group consisting of hydrocarbyl carboxylic acids, sulfur-containing hydrocarbyl carboxylic acids, hydroxy-containing hydrocarbyl carboxylic acids, hydroxy-containing hydrocarbyl carboxylic acids, phosphoric acid, sulfuric acid, sulphurous acid, nitric acid, nitrous acid, boric acid, arsenic acid and silicic acid.

This activator is one of a class described in U.S. Pat. No. 3,640,953, entitled "Stabilization of Polyvinylchloride Resins." The disclosure of U.S. Pat. No. 3,640,953 is hereby made a part of this disclosure. This patent states that as little as 0.25 weight percent of the stabilizer combination based on the weight of the resin will impart some resistance to heat deterioration, with a preference for an amount of the stabilizer combination between about 0.5 and about 5 percent by weight of the resin.

The present invention contemplates the use as an activator for the foaming of polyvinylchloride resin the previously described combination of at least one di-methyltin mercapto acid ester and a diorganotin oxide complex with an ester of an oxygen-containing acid. The selection of the specific components of the activator will depend on many factors including but not limited to the identity of the blowing agent, the specific polyvinylchloride resin, the article being prepared, the required physical properties of the foamed polyvinylchloride resin and the like.

For most purposes the diorganotin mercapto acid can be a thioglycolate. One of the often used thioglycolates is dimethyltin bis(isooctylthioglycolate). Commonly, due to its availability and the properties of having it included in the activator combination, the diorganotin oxide is a dialkyltin oxide. It has been found that the dibutyl tin oxide is particularly useful in the activator of the present invention. Many oxygen-containing acids are useful in the activator combination including but not limited to ethyl ortho silicate, triethyl arsenate, n-propyl nitrate, n-octyl nitrate, o-cresyl-p-toluene sulphonate, cyclohexyl p-toluene sulphonomide, di-n-propyl sulfate, di-n-dodecyl sulfate, trimethyl phosphate, triethyl phosphate, tri-n-propyl phosphate, tributylphosphate, triisobutyl phosphate, triamyl phosphate, tri-o-cresyl phosphate, tri-p-cresyl phosphate, tri-m-cresyl phosphate, triphenyl phosphate, trixylyl phosphate, butyl di-($\beta$-methoxyethyl) phosphate, butyl di($\beta$-ethyoxyethyl) phosphate, sorbityl hexaphosphate, amyl borate, methyl acetate, ethyl acetate, n-propylacetate, isopropyl acetate, butyl acetate, m-cresyl acetate, phenyl acetate, ethylene glycol diacetate, diglycerol tetraacetate, glycerol monolactate acetate, methyl propionate, n-butyl propionate, sec-butyl propionate, ethylene glycol dipropionate, triethylene glycol dipropionate, ethyl butyrate, n-propyl butyrate, butyl butyrate, pentyl butyrate, 2-propenyl butyrate, hexyl butyrate, ethylene glycol dibutyrate, ethyl laurate, phenyl laurate, ethyl stearate, butyl stearate, ethyl palmitate, 2-naphthyl lactate, ethyl benzoate, $\beta$-naphthyl benzoate, benzyl benzoate, methyl o-benzoyl benzoate, ethyl o-benzoyl benzoate, amyl benzoate, sorbityl hexabenzoate, diethyl oxalate, dibutyl oxalate, diethyl oxalate, diamyl oxalate, dimethyl maleate, diethyl maleate, dipropyl maleate, dioctyl maleate, dilauryl maleate, diethyl maleate, dipropenyl maleate, diethyl adipate, dibutyl adipate, ethoxyethyl adipate, diethyl sebacate, dibutyl sebacate, diethyl succinate, dibutyl succinate, triethyl citrate, tributyl citrate, dibutyl tartrate, dibutyl tartrate, diamyl tartrate, dimethyl phthalate, diethyl phthalate, propyl phthalate, dibutyl phthalate, dibutyl phthalate, diamyl phthalate, dioctyl phthalate, diisooctyl phthalate, butyl glycol phthalate, diphenyl phthalate, methoxyethyl phthalate, butoxyethyl phthalate, dimethyl cyclohexyl phthalate, methyl phthalyl ethyl glycolate, ethyl phthalyl ethyl glycolate, butyl phthalyl butyl glycolate, methyl salicylate, phenyl salicylate, dioctyl thiodipropionate and dithiobis (isooctyl propionate).

Conventional processing aids as well as conventional internal and external lubricants together with impact modifiers may be included in the formulation. Any of the well-known polymers made from acrylonitrile, butadiene and styrene and generally referred to as ABS resins, made in a conventional manner may be used when more resistance to fracture by impact is desirable. More specifically the modifier is a graft resin in which from 20 to 30 parts of acrylonitrile and from 80 to 70 parts of styrene are polymerized in the presence of polybutadiene. The ratio of polybutadiene is acrylonitrile/styrene resin grafted thereon ranges from 15/85 to 45/55. The impact modifier is further described in British Pat. No. 1,090,670 as being an acrylonitrile/butadiene/styrene resin having a tensile strength of from about 2,400 pounds per square inch at 73° F. and a specific gravity of 0.99 to a tensile strength of 5,500 pounds per square inch and a specific gravity of about 1.04.

Conventional processing aids may also be used in the amounts necessary to smooth and homogenize the blowable composition melt and facilitate its passage through a conventional extruder.

After the components in the noted formulation have been mixed in the manner described, this dry blend composition is then processed in a conventional extruder which has been fitted with the desired die and which extruder has been heated to the desired temperature. The extruder is then operated at a screw speed under a motor load as indicated at the rate indicated. These temperatures and residence time are commercially acceptable and may be used because the composition being extruded has been balanced, particularly with respect to the activator system, to permit the use of these conditions. Unless the activator system as shown herein is used in the formulations described, there is danger of excessive decomposition of the exothermic chemical blowing agents resulting in loss of control and unsatisfactory cell structure, required profile dimensions and smoothness of skin which is dependent upon the internal microcellular structure of the profile.

The chemical balance present in the blowable composition of this invention results in the proper fluxing of the vinyl resin to produce a molten mixture into which the gaseous nitrogen is released at the proper time by the blowing agent, which then becomes dissolved in the molten plastic under the operating pressures of the extruder. As the plastic molt passes through the die into the atmosphere the pressure built up within the extruder is relieved causing the dissolved gaseous nitrogen to emerge from solution and form the microcellular gas cells uniformly throughout the extruded mass other than within the skin layer. The skin layer forms because of the laminar flow across the relatively cool metal surface of the die. Laminar flow is described as being a series of concentric layers of molten plastic, the most interior layer moving somewhat faster than the outer layers. The molten thermoplastic mixture that touches the cooler metal surface of the die becomes much more viscous than the next layer thereof and as a result a smearing action drives the gaseous nitrogen into the interior layers of the profile to thereby form a relatively smooth and integral skin. The successful performance as just described depends upon the formulation of the expandable composition and particularly upon the combination of the activator system described herein in combination with the chemical blowing agent and the particular resin being blown.

The formation of a smooth integral skin is dependent, among other things, upon the amount of chemical blowing agent used. If a certain porosity is desired beyond an amount which requires a greater amount of blowing agent, it is obvious that although the increased porosity is achieved, the skin will have been disrupted and its smoothness destroyed. The present invention permits a maximum expansion of the extruded profile or a minimum density foam without destroying the requirements of a smooth and integral skin. This is achieved in the present invention by the use of the activatory system which functions to extract a maximum amount of gas from the blowing agent at the preferred thermal conditions for extrusion thus producing a blow which would otherwise be possible only by increasing the amount of the blowing agent. Thus the present activator system of this invention permits a fine adjustment with regard to the amount of gas released from the chemical blowing agent and thus preserving the desirable properties of the smooth and integral skin required for the profile. The activator system of this invention functions to control the temperature and rate at which the gaseous nitrogen is released from the chemical blowing agent, which temperature and rate is adjusted in such a way that the resin composition becomes a plastic melt at a temperature to permit its expansion while at the same time restricting the side of the cells to the microcellular characteristics required in the profile.

The utility of the foamed polyvinylchloride resins of the present invention is extensive, being useful wherever foamed polyvinylchloride resin has found utility. It is particularly of value in locations where it is visible since by use of the present activators in the foaming operation, the foamed resin does not become colored as can occur when the foaming occurs at high temperatures. Thus, for example, the foamed polyvinylchloride resins of the present process can be used as the outermost layer of pipe by coextrusion with unfoamed resin. Other such visible uses include construction profiles such as window and door frames. By limiting the discoloration of the resin and forming a skin of good texture, the present process produces foamed resin which is not limited by its appearance to interior applications.

In order to determine the usefulness of the activators of the present invention in the foaming of polyvinylchloride resins and to compare their effectiveness with that of activators for the foaming of polyvinylchloride described in the literature, two series of tests were performed. The only difference between each series of tests was the level of blowing agent i.e., series one used 2.0 parts of blowing in the formulation and series two used 4.0 parts of blowing agent in the formulation. Each series of formulations as described hereinafter were blended on a two-roll mill, and then sheeted off. Samples were cut from the sheets and heated in an oven at three temperature levels; i.e., 350° F., 375° F. and 400° F. Samples were withdrawn at timed intervals and a visual determination of the color and textures of each experimental sample was conducted. The formulation used in each experimental sample was as follows:

|  | Weight (grams) |
| --- | --- |
| Polyvinylchloride (Conoco 5385) | 200 |
| Calcium stearate | 1.60 |
| Paraffin wax (Wax 160) | 2.80 |
| Calcium carbonate | 10.0 |
| Titanium oxide | 2.0 |
| Acrylic Impact Modifier (KM323) | 12.0 |
| Acrylic Processing Acid (K175) | 2.0 |
| Azocarbonamide (Celogen AZ) | 2.0 or 4.0 |
| Activator (Except for Sample G) | 3.0 |

The following activator systems were used in these experiments:
A) dibutyltinisooctylthioglycolate
B) blend of about 20% mono- and about 80% dimethyltinisooctylthioglycolate
C) blend of dibutyltinisooctylthioglycolate and an equal weight amount of dibutyltin oxide diisooctylphthalate complex
D) blend of activator (B) above and an equal amount by weight of the dibutyltin oxide-diisooctylphthalate
E) dibutyltin isooctyl beta-mercaptopropionate
F) blend of dibutyltinisooctylthioglycolate (3.0 grams) and barium stearate (2.0 grams)
G) blend of dibutyltinisooctylbeta-mercaptopropionatre and an equal amount by weight of dibutyltin bis(nonylphenate)

H) blend of dibutyltinisooctylbeta-mercaptopropionate and dibutyltin bis(nonylphenate) in a weight ratio of 3:7

I) blend of dibutyltinisooctylbeta-mercaptopropionate and an equal amount by weight of dibutyltin di(isostearate)

J) blend of dibutyltinisooctylbeta-mercaptopropionate and dibutyltin di(isotearate) in a weight ratio of 3:7

K) blend of dibutyltin isooctylbeta-mercaptopropionate and overbased dibutyltin dilaurate in a ratio by weight of 3-7

Samples of the materials maintained at 350° F. were taken at 10 minute intervals, the last sample being removed from the oven 80 minutes after the material was placed into the oven. Samples of the materials maintained at 370° F. and 400° F. were taken at 5 minute intervals, the last sample being removed from the oven 40 minutes after the materials were placed into the oven.

The samples of the test materials maintained at the described elevated temperatures were then visually reviewed and compared for color and for surface quality. The tests performed using 2.0 grams of the azodicarbonamide blowing agent gave more discernible comparisons of the activators than the tests performed using 4.0 grams of the azodicarbonamide. Also the samples removed after being maintained 10 minutes at 350° F. were deemed the most representative tests.

Color distortion is an indication of the heat stability of the composition. In reviewing the test samples for color distortion, particularly the materials containing 2.0 grams of blowing agent maintained at 350° F. for 10 minutes, material D demonstrated the highest degree of color stability. Materials E and K were rated as having good color stability; B, C and G had fair color stability and A, F, H, I and J showed poor color stability.

Similarly, the test samples were reviewed for extent of foaming by examining the textures of the samples, particularly the materials containing 2.0 grams of blowing agent (azodicarbonamide) maintained at 350° F. for 10 minutes. This review showed that materials B, C, D, E, H, I and J had good foaming, materials G and I showed fair foaming; materials A and F did not foam.

Thus the aforedescribed experiments demonstrate that the present invention in addition to being a superb process for foaming vinylchloride resin, imparts excellent heat stability to the foamed product. Furthermore these experiments show that the present invention by providing this high level of thermal stability, produces a foamed rigid polyvinylchloride article superior to the other tested materials.

While certain representative embodiments and details have been shown for the purpose of illustrating the invention, it will be apparent to those skilled in this art that various changes and modifications may be made therein without departing from the spirit or scope of the invention.

We claim:

1. A foamable polyvinylchloride material containing a chemical flowing agent and an effective foam activating amount of a mixture comprising (a) at least one organotin mercapto acid ester having the formula:

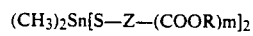

$(CH_3)_2Sn[S-Z-(COOR)m]_2$ wherein Z is an organic radical having from one to about thirty carbon atoms, and R is an organic group derived from an alcohol having from one to about four hydroxyl groups and from one to thirty carbon atoms, and m is an integer from one to four, and (b) a diorganotin oxide complex with an ester of an oxygen-containing acid, wherein the two organo groups are each attached to tin through carbon atoms and are hydrocarbon radicals having from one to about thirty carbon atoms, and said complex is derived from the reaction of the diorganotin oxide with an ester derived from an aliphatic or aromatic alcohol or phenol and an acid selected from the group consisting of hydrocarbyl carboxylic acids, sulfur-containing hydrocarbyl carboxylic acids, hydroxy-containing hydrocarbyl carboxylic acids, phosphoric acid, sulfuric acid, sulphurous acid, nitric acid, nitrous acid, boric acid, arsenic acid and silicic acid.

2. A foamable polyvinylchloride material in accordance with claim 1 wherein the blowing agent is an azodicarbonamide.

3. A foamable polyvinylchloride material in accordance with claim 2 wherein the diorganotin mercapto acid ester is a thioglycolate.

4. A foamable polyvinylchloride material in accordance with claim 3 wherein the diorganotin mercapto acid ester is dimethyltin bis(isooctylthioglycolate).

5. A foamable polyvinylchloride material in accordance with claim 3 wherein the diorganotin oxide is a dialkyltin oxide.

6. A foamable polyvinylchloride material in accordance with claim 5 wherein the dialkyltin oxide is dibutyltin oxide.

7. A foamable polyvinylchloride material in accordance with claim 5 wherein the ester of an oxygen-containing acid is an alkyl ester of phthalic acid.

8. A foamable polyvinylchloride material in accordance with claim 6 wherein the ester of an oxygen-containing acid is diisooctyl phthalate.

* * * * *